(12) United States Patent
Kiparissides et al.

(10) Patent No.: US 6,335,386 B1
(45) Date of Patent: Jan. 1, 2002

(54) BONDING MATERIALS

(75) Inventors: Constantinos Kiparissides; Pavlos Mouratidis; Aristi Bachtsi; Sofia Alexandridou, all of Thessaloniki (GR)

(73) Assignee: Marlit Ltd., Thessaloniki (GR)

( * ) Notice: Subject to any disclaimer, the term of this patent is extended or adjusted under 35 U.S.C. 154(b) by 0 days.

(21) Appl. No.: 09/297,900

(22) PCT Filed: Nov. 13, 1997

(86) PCT No.: PCT/GR97/00039

§ 371 Date: Jun. 21, 1999

§ 102(e) Date: Jun. 21, 1999

(87) PCT Pub. No.: WO98/22549

PCT Pub. Date: May 28, 1998

(30) Foreign Application Priority Data

Nov. 15, 1998 (GB) .............................................. 9623878

(51) Int. Cl.$^7$ .................................................. C08K 9/10
(52) U.S. Cl. ........................................ 523/211; 523/210
(58) Field of Search ................................. 523/210, 211

(56) References Cited

U.S. PATENT DOCUMENTS

| | | | | |
|---|---|---|---|---|
| 4,307,206 A | | 12/1981 | Higuchi et al. ................. 525/4 |
| 4,460,722 A | * | 7/1984 | Igarashi ...................... 523/206 |
| 4,536,524 A | * | 8/1985 | Hart ............................ 523/176 |
| 4,808,639 A | | 2/1989 | Chernack .................... 523/211 |
| 4,936,916 A | * | 6/1990 | Shinmitsu .................... 106/21 |
| 4,997,862 A | * | 3/1991 | Lark ........................... 523/210 |
| 5,385,959 A | * | 1/1995 | Tsaur .......................... 523/201 |
| 5,441,660 A | * | 8/1995 | Tsaur .......................... 252/95 |
| 5,741,592 A | * | 4/1998 | Lewis .................... 428/402.24 |

FOREIGN PATENT DOCUMENTS

| | | |
|---|---|---|
| DE | 2635570 | 2/1978 |
| EP | 0115307 | 8/1984 |
| EP | 0278582 | 8/1988 |
| EP | 0320712 | 6/1989 |
| EP | 0332754 | 9/1989 |
| EP | 0341569 | 11/1989 |
| EP | 0383406 | 8/1990 |
| EP | 0392170 | 10/1990 |
| EP | 0477135 | 3/1992 |
| EP | 0484157 | 5/1992 |
| EP | 0547379 | 6/1993 |
| WO | 9112293 | 8/1991 |
| WO | 9523823 | 9/1995 |
| WO | 9600747 | 1/1996 |
| WO | 9609883 | 4/1996 |

OTHER PUBLICATIONS

Patent Abstracts of Japan 56011976 dated Feb. 5, 1981.
Patent Abstracts of Japan 60015450 dated Jan. 26, 1985.
Patent Abstracts of Japan JP5310950 dated Nov. 22, 1993.
Patent Abstracts of Japan JP7024303 dated Jan. 27, 1995.
Patent Abstracts of Japan JP8081668 dated Mar. 26, 1996.

* cited by examiner

*Primary Examiner*—Paul R. Michl
(74) *Attorney, Agent, or Firm*—Ladas & Parry

(57) ABSTRACT

A composition for bonding ligno-cellulosic materials to form shaped products, the composition containing a formaldehyde based thermosetting bonding agent and capsules containing an agent reactive with said bonding agent which is at least one of a resin hardening agent, a flame/fire retardant and a water absorbent, wherein the capsules have walls that are capable of degradation to allow access of the agent to the bonding material, such degradation being at a temperature above the temperature prevailing in the system prior to application of heat in a final compression and heating stage.

18 Claims, No Drawings

BONDING MATERIALS

According to the present invention there are provided bonding compositions and methods of bonding.

In the manufacture of panel products from ligno-cellulosic materials, an adhesive composition which is a formaldehyde-based polycondensation resin system is added to the ligno-cellulosic materials before placing in a press which applies heat and pressure to cure the adhesive and bond the materials.

Thus, for example, an adhesive composition will be mixed and applied to the fibres or chips of materials such as wood or other cellulosic materials such as straw in the forming of fibreboards or particleboards or to the surface of a veneer in the forming of plywood.

Such adhesives are usually prepared prior to application in the form of a liquid mass called the glue mix which comprises the adhesive, some other additives and the hardener which catalyses the curing of the resin or bonding agent in the press. Thus one employs a urea- or melamine-formaldehyde or other formaldehyde-based adhesive and a hardening agent which is conventionally an inorganic acid or salt. Blending such a hardening agent into the bonding agent or prepolymer has the disadvantage that, if for any reason there is a delay between the blending of the polymer and hardening agent and application to the ligno-cellulosic material, then cure may proceed prematurely. Particularly this is true when a free acid is employed and for that reason it is preferred to use a salt, particularly an ammonium salt. On the other hand these are less active as hardening agents and therefore require longer in the final heat/pressure stage than the free acids.

A further problem has been the increasing use of ligno-cellulosic materials which may be at a slightly elevated temperature just prior to addition of the bonding agent, which again can result in premature curing of the bonding agent.

A similar problem is found with two other active agents used in such bonded materials namely water absorbents, and flame/fire-retardants.

These agents share the common problem of possibly causing premature curing if incorporated into the bonding material prior to admixture with the ligno-cellulosic material. Flame/fire retardants as additives of the gluing formulation interfere with the curing reaction of the bonding resin and represent therefore a barrier to the control of the timing of the resin curing. Water absorbents interfere with the kinetics of the resin polycondensation reaction due to their water absorbing function, which shifts the reaction towards condensation accompanied by water production and thus towards premature curing. It is also desirable to have them co-acting with active hardeners since the reduction of press cycle can result in blisters in the product because of violent escape of water on press opening.

Various means, such as the use of buffers, have been suggested for delaying the action of such active agents, particularly hardening agents, but, as indicated, these can have the undesirable effect of slowing down the reaction of the hardening agent or other active agent once the product is in the final press stage of manufacture.

Using active agents (eg. hardeners) in a solid, particulate form in which the particles are coated has been one suggestion in epoxy resin formulations but it has been difficult to find a coating which would not adversely affect the reaction of the active agent especially a hardener.

Thus JP 05 310950A, JP07-024303 and JP08-081668 relate to encapsulation of isocyanate binders and are not relevant to the problems of formaldehyde polycondensation products in manufacture of lignocellulosic shaped products.

EP 0 392 170 and EP 0 547 379 relate to encapsulation of one component of a two-component polyurethane adhesive and there is no discussion of condensation polymerisation systems using an active accelerator.

DE-A-2635570, WO-A-9112293, WO-A-960983 refer to various adhesive systems (polysulfides-polythioethers, polyesters, ethylene polymers and epoxy resins respectively) and the encapsulation of the corresponding active agents.

U.S. Pat. No. 4,808,639 relates to a liquid or viscous microcapsules-containing curable adhesive composition composed of a liquid or viscous curable resin, which contains, dispersed therethroughout, a multiplicity of rupturable microcapsules of a resin curing agent. However, the content of these microcapsules can only be released by the application thereto of external pressure, abrasive action, shear stress or other mechanical manipulation.

EP 0 115 307, WO 95/23823 and WO 96/00747 relate to protection of the bonding agent resin as distinct from an activating agent.

EP-A-0 278 582 relates to encapsulation of a water-proofing agent in the paper industry to delay reaction of the hardening agent with a starch adhesive.

U.S. Pat. No. 4,307,206 discloses urea-formaldehyde resin with encapsulated alkaline component to neutralise excess acid after cure and there is no discussion of controlling timing by encapsulating an acidic activator.

EP-A-0 341 569 discloses encapsulating a formaldehyde scavenger eg urea to reduce free formaldehyde emission. There are references to including "catalyst" with the urea but in the context of enhancing the urea formaldehyde reaction and there is no discussion of imposing the shaped article with shorter press times while avoiding premature reaction.

There are various discussions of methods of encapsulating materials to protect those materials against the environment but usually this has been discussed in the context of releasing the content of the capsules as a result of mechanical impact on the capsule wall.

A capsule subject to such mechanical degradation would not provide sufficient protection within the context of the handling of a bonding composition including the application to the ligno-cellulosic material and including the formation of the bonding composition or the precursor of the bonding composition and application material.

According to the present invention there is provided a formaldehyde-based polycondensation system composition for bonding ligno-cellulosic materials to form shaped products which contains an active agent which is at least one of a resin hardening agent, flame/fire retardant and water absorbent characterised in that the agent or agents are incorporated as capsules, the walls of the capsules being capable of degradation to allow access of the agent to the bonding material, such degradation being at a temperature above the temperature prevailing in the system prior to application of the heat in the final compression and the heating stage.

The invention also provides a method of forming a shaped ligno-cellulosic based material with a formaldehyde based polycondensation bonding material under heat and pressure in which the bonding material is blended with an encapsulated active agent which is at least one of a resin hardening agent, a flame/fire retardant agent and water absorbent with the capsule wall resisting direct contact between the bonding material and agent until the product is placed in the final heating stage for manufacture of the shaped product at which time the walls of the capsules are degraded at a temperature above that which the composition has been held before it entered the said stage.

The invention also relates to use of a formaldehyde-based polycondensation resin system which contains an active agent which is at least one of a resin hardening agent a flame/fire retardant and a water absorbent characterised in that the agent is incorporated as capsules, the walls of the capsules being subject to degradation to allow access of the agent to the bonding material, such degradation being at a temperature above the temperature prevailing in the system prior to application of the heat in the final compression and the heating stage.

By degradation is meant collapse or disintegration of the wall material whereby the contents of the capsule are released into or can contact the adhesive. The invention is particularly applicable to hardening agents but can be applied to other two additives of the glue mix namey flame/fire retardants and water absorbents.

The degradation of the walls of the capsules is achieved by selecting a material for such wall which tends to melt or degrade at the appropriate temperature. For example the capsule wall material can have sufficient cohesion to form a capsule wall and have a melting point in excess of the minimum temperature existing prior to entry of the material into the press but melting shortly after the temperature starts to rise in the press. By the press is meant the unit in formation of a shaped article from adhesive or bonding agent and ligno-cellulose material which applies heat and possibly pressure to effect cure of the bonding material.

The degradation or melting point will therefore depend on the particular conditions of the process or plant in question but a melting or degradation point of 45–100° C. is particularly suitable, more specifically 60–90°.

A particularly useful group of materials having melting points capable of forming capsule coatings are waxes which can be animal waxes, vegetable waxes or petroleum waxes, for example paraffin waxes, micro talline waxes and mineral waxes.

Most preferred waxes are, for example, paraffin wax, carnauba wax and beeswax. Alternative encapsulating materials could be polymeric materials which degrade either inherently or because of the presence of activating agents at a temperature above the minimum degradation temperature. This type of degradation is chemical degradation as distinct from simple melting. An activating agent for this purpose could be one which destroys bonds which create the polymeric structure. These polymeric degradation activating agents may not be the same as the curing agents which are encapsulated.

Thus low melting point materials besides waxes can be visualised for this invention, including polymers with low melting temperatures. Thus other wall materials could be hydrocolloids, sugar type materials or any other materials known in the art as being capable of forming microcapsule wall structures.

Typical encapsulants are gums (eg. gum arabic), polysaccharides (eg. maltodextrin, starches), natural gelling materials (eg. gelatin, alginates), semisynthetic materials (eg. cellulosic material high molecular weight stearates) and synthetic polymers (eg. polyacrylates, polyamides and polysiloxanes).

The degradation of the wall of the capsule need not be complete but it should be sufficient to allow contents of the capsule to come into contact with a surrounding adhesive by escape of the contents (eg. if liquid) leaching, diffusion or simple physical contact.

The structure of the capsule should be such that the wall is as thin as possible consistent with the desire to maintain integrity up to the point at which part of the wall capsule starts to degrade in the desired environment. An excessive amount of wall material could not only interfere with the activity of the hardener but also prejudice the strength of resulting product. The weight ratio of the core material to the capsule wall material can be from 1:1 to 1:6.

The size of the capsules used would depend on the nature of the hardening material. A hardener in liquid form which can diffuse once the capsule breaks could clearly enable a larger sized capsule to be used than one in which the capsule content is solid.

However, generally speaking, the capsules will have the dimensions appropriate to the products sometimes known as microcapsules, ie. capsules from a few microns to 4000 $\mu$m or even larger. The term micro is sometimes applied to capsules up to 200 $\mu$m but is not so limited in this application.

As stated, the active agent can be one or more of three agents which improve either the curing of the adhesive or the other properties of the product. Particularly a hardener or accelerator which is encapsulated in accordance with the present invention can be a hardener conventionally used to accelerate formaldehyde-based polycondensation resins cure for hot pressing of ligno-cellulosic bonded materials especially organic and inorganic acids or salts, for example, inorganic acids such as sulphuric acid, hydrochloric acid or organic acids such as oxalic acid, formic acid, adipic acid and the salts of these acids. Salts of these acids are such as ferric sulphate, ammonium sulphate or organic salts. The amount of hardener by weight of resin should be at least 0.5% and probably normally range from 1 to 10%.

Flame/fire retardants are those compounds conventionally used in this type of product to increase flame resistance and reduce the risk of flammability. Some compounds have both functions and some are more specific to each function but generally the terms overlap.

Similarly water absorbents are those compounds conventionally included for this function, i.e. absorbing water.

Typical flame/fire retardants are of the following families of compounds:

phosphates sulphates borates nitrogen compounds boron compounds for example mono- and di-ammonium-hydrogen-phosphate, hexametaphosphate, kaolin, silica glass or water glass, calcium carbonate, aluminum chloride or aluminum oxide, antimony chloride or antimony oxide, boric acid, bromine, chlorine.

Typical water absorbents are sodium carboxymethyl cellulose poly(acrylic acid) salts radiation-cross-linked polyethylene oxides carboxymethyl cellulose fibres polyacrylate films grafted starch absorbers hydrolyzed polyacrylonitrile poly(vinyl alcohol-sodium acrylate)

poly(isobutylen disodium maleate)

The capsules can be formed by any of the conventional methods available in the art depending on the nature of the encapsulating wall material and the core.

Methods such as polymer-polymer phase separation sometimes called coacervation, polymer-polymer incompatibility techniques, interfacial polymerisation spray drying and congealing including spray chilling, cooling and congealing fluidised-bed coating processes and air suspension procese pancoating processes, desolvation proeses, electrostatic encapsulation and solvent evaporation processes. The nature and conditions of a process will, as indicated, depend on the encapsulating material, the core material and the conditions necessary to obtain a capsule of the designed wall thickness.

Factors affecting the quality of capsules are:
choice of solvent, including mixture of solvents, solubility and nature of core material, ratio of removal of liquid carrier for encapsulant material, type and molecular mass and crystallinity of encapsulant.

Some processes are more suitable for encapsuating a particular material. In one aspect of the invention, the hardener could be in aqueous solution and the core of the capsule formed could be droplets of such aqueous solution.

Particularly where the capsule wall is a waxy type material the resulting encapsulated material may create difficulties in dispersing in the resin adhesive material and it may be desirable to incorporate a surface active agent in the encapsulating material which may assist in dispersing over the core material and when the capsules are formed assist and disperse the capsules in the adhesive.

Alternatively, once the capsule is formed, an outer layer could be formed thereon to provide properties to the multi-layer capsule and dispersible properties to the multi-layer capsule.

Such outer layer could be continuous or discontinuous ie. a powdered coating on the walls of the capsule.

In one particular aspect of the invention the material to form the core material can be an aqueous solution or dispersion which is dispersed in a molten waxy material particularly by emulsifying a solution of the core material in a mixture of waxy material and surface active agent.

The initial emulsion is formed by mixing at a low shear a lower melting wax with emulsifying agent at a temperature above the melting point of the wax to obtain a homogenous mixture.

An aqueous solution of the activating agent is then added at a high shear to provide a homogenization or sonication to obtain a uniform dis on of particles of the aqueous phase in the wax system, said particles having the desired particle size for the final product.

In this embodiment the molten emulsion of core material and wax once formed is sprayed into the gas stream in a conventional spray drier unit, stream passing concurrently to the emulsion.

The resulting emulsion can be sprayed into a gas stream through a spray nozzle at a temperature below the melting point of the wax to form the micro encapsulated material. Such micro particles can have an average less than 5 $\mu$m size but particles can range from 1 $\mu$m upwards. This process will form a core aqueous solution of the hardener and an outer or encapsulating wax layer capable of melting at a temperature usually at least 45° C. When the surface active agent, particularly a water in oil emulsifying agent is present it is usually present in amounts of from 0.5 to about 10% by weight of the wax encapsulant. By control of the coating, some of the surface active agent can be at the surface of the capsule to provide appropriate dispersability properties.

In another aspect of the invention, the core material can be formed by the solid particles of material which may be inert or otherwise with regard to the activity of the system, which are sprayed with an aqueous solution of the hardening agent and are subsequently covered with a layer of a molten waxy material.

The solid particles to be covered are placed in a coating chamber where they are suspended in a hot air stream, which causes cyclic flow of the particles. The hardener solution is sprayed onto the particles through a nozzle. A hardener film is thus formed onto the particles surface because of solvent evaporation and liquid absorption on the porous solid particles. At a second stage, the particles obtained are covered with a molten wax material. In this case, the temperature of the hot air stream is lower than the melting point of the wax material thus causing its solidification.

The shape and size of the final capsules depend on the respective characteristics of the initial solid particles which cannot be of smaller size than 100 $\mu$m. The quality of the wax coating depends on the spherical size of these particles and the wall thickness can be easily controlled.

EXAMPLE 1

An aqueous solution of 60% by weight oxalic acid was heated and the solution emulsified in a molten paraffin wax containing 0.25 parts by weight wax of a water in oil emulsifier in the proportions of 1 part aqueous solution to 5 parts molten wax. The emulsion was formed at 70° C. with a probe sonicator.

The resulting emulsion is fed into a heat controlled spray nozzle of a spray drier unit under a spraying pressure of 5–8 bar through a nozzle orifice of 0.7 mm, the spray drier unit being operated at the temperature of 35° C.

Capsules were formed having an average particle size of 1–10 $\mu$m and an average wall thickness of 0.4–4 $\mu$m.

The resulting encapulated oxalic acid was added to a conventional glue pot mix unit together with standard urea formaldehyde resin having a molar ratio of formaldehyd urea of 1.1:1. The properties of a typical resin were as follow:

| | |
|---|---|
| Viscosity at 20° C. [cp] | 330 |
| pH range | 8.0 |
| Solids content [%][1] | 65.5 |
| sp. gr. at 20° C. [g/cm$^3$] | 1.288 |
| Free formaldehyde [%] | 0.17 |
| Water tolerance at 20° C. | 1:3 |
| Gel time [s][2] | 59 |
| Storage at 20° C. | >6 weeks |
| Appearance | translucent liquid |

[1] 2 h at 120° C.
[2] 2% solid (NH$_4$)$_2$SO$_4$ hardener on resin solids

The resulting composition containing amounts measured by weight of oxalic acid by weight of resin were compared with compositions containing similar amounts of oxalic acid in non-encapsulated form. Ammonium sulphate, a typical hardener for urea-formaldehyde resins, was used as a reference.

The resulting compositions were tested at 100° C. to determine the activity, ie. formation of hard resin, and stability of pot life, ie time taken to harden at 40° C.

As seen from the following tables, the gel times for encapsulated and non-encapsulated material are not significantly different, ie. activity at 100° C. is not significantly different but the encapulated material showed a very considerable improvement of pot life at 40° C. However, the pot life/gel time ratio of the encapsulated oxalic acid is not so different from the one of the conventional hardener.

| Type of Hardener | Hardener concentration | Gel time 100° C. (s) | Pot Life 40° C. (min) | Pot life/ Gel time |
|---|---|---|---|---|
| $(NH_4)_2SO_4$ | 3.0% | 60 | 205 | 205 |
| Oxalic acid | 0.5% | 65 | 15 | 14 |
|  | 1.5% | 17 | 2 | 7 |
| Encapsulated oxalic acid | 1.0% | 40 | 200 | 300 |
|  | 1.5% | 30 | 135 | 270 |
|  | 2.0% | 20 | 80 | 240 |

Single-layer boards were prepared in the laboratory by using the above materials. In the case of non-encapsulated oxalic acid, an amount of buffer ammonia was used to delay its hardening action.

The boards were pressed at 8.0 and 6.5 s/mm. The thickness of the boards was 16 mm. The press temperature was 200° C. and the pressure 35 kp/cm². The dimensions of the boards produced were 43×43 cm.

The results obtained are reported in the following table and are average values.

|  | $(NH_4)_2SO_4$ | Oxalic acid | Encapsulated oxalic acid |
|---|---|---|---|
| % of hardener | 3.0 | 1.5 | 1.5 |
| Density, kg/m³ | 650 | 648 | 651 |
| Tensile strength, N/mm² | 0.35 | 0.48 | 0.50 |
| 2 h thickness swelling, % | 12.7 | 8.5 | 7.8 |
| 24 h thickness swelling, % | 34.1 | 22.8 | 20.3 |

EXAMPLE 2

A 40% solution of $Fe_2(SO_4)_3$ was sprayed onto sugar pellets with particle size of 500–600 μm in the coating chamber of a fluidized-bed unit. The inlet and outlet air temperature were 45–70° C. and 40–60° C. respectively. The weight ratio of sugar to $Fe_2(SO_4)_3$ was 4:1.

The resulting particles were subsequently covered by a molten polyethylene wax with a melting point of 76–78° C. in the same unit. At this stage the inlet and outlet air temperature were 55–60° C. and 40–50° C. respectively. The weight ratio of the particles to the wax was 1:1.

The fluidized-bed unit operated at a spraying rate of 20–40 g/min and an air speed of 7–10 m/s. Thus, the capsules obtained had an increased particle size of about 100 μm in comparison with the initial sugar pellets used.

The same urea formaldehyde resin as in Example 1 was used for the evaluation of these capsules. In this case, the pot life values of the encapsulated material are significantly improved in comparison with the non-encapsulated and the conventional hardener. This is due to the better control of the capsule wall thickness achieved by this process.

| Type of hardener | Hardener concentration | Gel time 100° C. (s) | Pot life 40° C. (min) | Pot life/ Gel time |
|---|---|---|---|---|
| $(NH_4)_2SO_4$ | 3.0% | 62 | 215 | 208 |
| $Fe_2(SO_4)_3$ | 0.5% | 68 | 35 | 31 |
|  | 2.0% | 20 | 4 | 12 |
| Encapsulated $Fe_2(SO_4)_3$ | 1.5% | 88 | 1800 | 1227 |
|  | 2.0% | 71 | 780 | 659 |

Single-layer boards were prepared in the laboratory. In the case of non-encapsulated $Fe_2(SO_4)_3$ an amount of buffer ammonia was used to delay its hardening action.

The boards were pressed at 8.0 and 6.5 s/mm. The thickness of the boards was 16 mm.

The press temperature was 200° C. and the pressure 35 kp/cm². The dimensions of the boards produced were 43×43 cm.

The results obtained are reported in the following table and are average values.

|  | $(NH_4)_2SO_4$ | $Fe_2(SO_4)_3$ | Encapsulated $Fe_2(SO_4)_3$ |
|---|---|---|---|
| % of hardener | 3.0 | 2.0 | 2.0 |
| Density, kg/m³ | 655 | 652 | 659 |
| Tensile strength, N/mm² | 0.39 | 0.40 | 0.45 |
| 2 h thickness swelling, % | 11.3 | 12.1 | 9.2 |
| 24 h thickness swelling, % | 33.2 | 34.0 | 24.5 |

What is claimed is:

1. A composition for bonding ligno-cellulosic materials to form shaped products, the composition containing a formaldehyde based thermosetting bonding agent and capsules containing an agent reactive with said bonding agent which is at least one of a resin hardening agent, a flame/fire retardant and a water absorbent, wherein the capsules have walls that are capable of degradation to allow access of the agent to the bonding material, such degradation being at a temperature above the temperature prevailing in the system prior to application of heat in a final compression and heating stage.

2. A composition according to claim 1, wherein the resin hardening agent is in aqueous dispersion.

3. A composition according to claim 1, wherein the walls of the capsules are formed from a wax.

4. A composition according to claim 1, wherein the walls degrade at from 30° C. to 80° C.

5. A composition according claim 1, wherein the walls degrade at from 40° C. to 80° C.

6. A composition according to claim 1, wherein the weight ratio of core material and capsule wall material in the capsules is from 1:1 to 1:6.

7. A composition according to claim 1, wherein the bonding agent and the capsules are blended together with the bonding agent surrounding the capsules.

8. A composition according to claim 7, wherein the capsules contain the resin hardening agent, said resin hardening agent being present in the composition in an amount between 1 and 10% by weight of the bonding agent.

9. A method of forming a shaped lignocellulosic based material with a formaldehyde based polycondensation thermosetting bonding agent under heat and pressure in which the bonding material is blended with an encapsulated active agent which is at least one of a resin hardening agent, a flame/fire retardant agent and a water absorbent with the capsule wall resisting direct contact between the bonding material and agent until the product is placed in a final heating stage for manufacture of the shaped product at which time the walls of the capsules are degraded at a temperature above that at which the composition has been held before it entered said stage.

10. A method according to claim 9, wherein the active agent is dispersed in molten wax which is formed into droplets and hardened by spraying into an environment of temperature below the melting point of the wax.

11. A method according to claim 10, wherein the active agent is a resin hardening agent in aqueous dispersion which is emulsified in said molten wax.

12. A method according to claim 9, wherein solid particles containing the active agent are covered with a layer of molten waxy material.

13. A method according to claim 12, wherein an aqueous solution of the active agent is sprayed onto the solid particles of a core material.

14. A ligno-cellulosic based material containing a formaldehyde based polycondensation bonding agent with which cellulosic material is formable to a final shaped product under heat and pressure, said bonding agent being blended with at least an encapsulated active agent which agent is at least one of a resin hardening agent, a flame/fire retardant agent and a water absorbent, the capsule wall of said encapsulant resisting direct contact between the bonding agent and the active agent until subjected to temperature above that prevailing in the combination of cellulosic material and bonding agent during final forming stages of the shaped article.

15. A method comprising (a) providing a formaldehyde-based polycondensation resin system which contains a formaldehyde based thermosetting bonding agent and an active agent which is at least one of a resin hardening agent, a flame/fire retardant and a water-absorbent, the active agent being incorporated as capsules in the formaldehyde based thermosetting bonding agent, the capsules having walls that prevent contact between the active agent and the bonding agent at an initial temperature of the system but that degrade to permit contact between the active agent and the bonding agent when the system is heated sufficiently above said initial temperature; and (b) shaping a ligno-cellulosic material by pressing the material with the formaldehyde-based polycondensation resin system with generation of heat sufficient to degrade the walls of the capsules so as to cause contact between the active agent and the bonding agent.

16. The method according to claim 15, wherein the ligno-cellulosic material shaped in step (b) is in the form of fibers or chips.

17. A composition according to claim 16, wherein the bonding agent and the capsules are blended together with the bonding agent surrounding the capsules.

18. A composition according to claim 17, wherein the capsules contain the resin hardening agent, said resin hardening agent being present in the composition in an amount between 1 and 10% by weight of the bonding agent.

* * * * *

UNITED STATES PATENT AND TRADEMARK OFFICE
CERTIFICATE OF CORRECTION

PATENT NO. : 6,335,386 B1
DATED : January 1, 2002
INVENTOR(S) : Constantinos Kiparissides et al.

It is certified that error appears in the above-identified patent and that said Letters Patent is hereby corrected as shown below:

Title page,
Item [30], "1998" should read -- 1996 --.

Signed and Sealed this

Twenty-first Day of May, 2002

Attest:

Attesting Officer

JAMES E. ROGAN
Director of the United States Patent and Trademark Office